(12) United States Patent
Kang et al.

(10) Patent No.: US 10,877,597 B2
(45) Date of Patent: Dec. 29, 2020

(54) UNINTENDED TOUCH REJECTION

(71) Applicant: Hewlett-Packard Development Company, L.P., Houston, TX (US)

(72) Inventors: Jinman Kang, San Diego, CA (US); David Bradley Short, San Diego, CA (US); Immanuel Amo, Redwood City, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 209 days.

(21) Appl. No.: 15/514,449

(22) PCT Filed: Sep. 30, 2014

(86) PCT No.: PCT/US2014/058221
§ 371 (c)(1),
(2) Date: Aug. 21, 2017

(87) PCT Pub. No.: WO2016/053281
PCT Pub. Date: Apr. 7, 2016

(65) Prior Publication Data
US 2017/0357373 A1    Dec. 14, 2017

(51) Int. Cl.
*G06F 3/041* (2006.01)
*G06F 3/01* (2006.01)
(Continued)

(52) U.S. Cl.
CPC ............ *G06F 3/0418* (2013.01); *G06F 3/017* (2013.01); *G06F 3/0304* (2013.01); *G06F 3/038* (2013.01);
(Continued)

(58) Field of Classification Search
CPC ........ G06F 3/041; G06F 3/0418; G06F 3/017; G06F 3/0304; G06F 3/03547;
(Continued)

(56) References Cited

U.S. PATENT DOCUMENTS 5,627,567 A * 5/1997 Davidson ............ G06F 3/04166
345/173
7,599,561 B2    10/2009 Wilson et al.
(Continued)

FOREIGN PATENT DOCUMENTS

CN        1577383 A      2/2005
CN        101227198      7/2008
(Continued)

OTHER PUBLICATIONS

Schwarz, J. et al., "Probabilistic Palm Rejection Using Spatiotemporal Touch Features and Iterative Classification," ACM, 2014, 4 pages.
(Continued)

*Primary Examiner* — Antonio Xavier
(74) *Attorney, Agent, or Firm* — HP Inc. Patent Department

(57) ABSTRACT

Examples relate to improving unintended touch rejection. The examples disclosed herein enable selecting, from a plurality of available modes of unintended touch rejection, a first mode of unintended touch rejection, capturing a first set of data associated with the first mode responsive to a touch being recognized at a touch-enabled surface of the system, and determining whether the recognized touch was intended based on the first set of data and a first set of criteria associated with the first mode of unintended touch rejection.

14 Claims, 5 Drawing Sheets

---

600 SELECT FIRST MODE OF UNINTENDED TOUCH REJECTION FROM SET OF MODES OF UNINTENDED TOUCH REJECTION

610 ACCESS DATA RELATED TO TOUCH EVENT BASED ON SELECTED FIRST MODE

620 DISREGARD ACCESSED DATA RESPONSIVE TO DETERMINING THAT TOUCH EVENT IS NOT INTENDED BASED ON SELECTED FIRST MODE OF UNINTENDED TOUCH REJECTION AND ACCESSED DATA

(51) Int. Cl.
*G06F 3/038* (2013.01)
*G06F 3/0488* (2013.01)
*G06F 3/0354* (2013.01)
*G06F 3/03* (2006.01)
*G06F 3/042* (2006.01)
*G06F 3/043* (2006.01)

(52) U.S. Cl.
CPC ...... *G06F 3/03547* (2013.01); *G06F 3/04883* (2013.01); *G06F 3/043* (2013.01); *G06F 3/0425* (2013.01); *G06F 2203/0381* (2013.01); *G06F 2203/04104* (2013.01); *G06F 2203/04106* (2013.01)

(58) Field of Classification Search
CPC .... G06F 3/04883; G06F 3/0425; G06F 3/043; G06F 2203/0381; G06F 2203/04104; G06F 2203/04106
See application file for complete search history.

(56) References Cited

U.S. PATENT DOCUMENTS

| | | | |
|---|---|---|---|
| 7,710,391 B2 | 5/2010 | Bell et al. | |
| 8,121,640 B2 | 2/2012 | Russ et al. | |
| 8,199,117 B2 | 6/2012 | Izadi et al. | |
| 8,436,821 B1* | 5/2013 | Plichta | G06F 3/04883 345/156 |
| 8,660,978 B2 | 2/2014 | Hinckley et al. | |
| 8,736,583 B2 | 5/2014 | Anderson et al. | |
| 2005/0017957 A1 | 1/2005 | Yi | |
| 2005/0078092 A1 | 4/2005 | Clapper | |
| 2005/0154798 A1* | 7/2005 | Nurmi | G06F 3/04883 710/1 |
| 2007/0152976 A1 | 7/2007 | Townsend et al. | |
| 2007/0268269 A1* | 11/2007 | Chang | G06F 3/0416 345/173 |
| 2008/0018591 A1 | 1/2008 | Pittel et al. | |
| 2008/0167071 A1* | 7/2008 | Forstall | H04M 1/7258 455/556.2 |
| 2010/0083109 A1* | 4/2010 | Tse | G09B 5/00 715/702 |
| 2010/0164479 A1* | 7/2010 | Alameh | G06F 1/1684 324/115 |
| 2011/0242054 A1 | 10/2011 | Tsu | |
| 2011/0251920 A1* | 10/2011 | Watson | G01C 21/206 705/26.9 |
| 2012/0133610 A1 | 5/2012 | Chen | |
| 2012/0154296 A1 | 6/2012 | Hinckley et al. | |
| 2012/0262407 A1 | 10/2012 | Hinckley et al. | |
| 2013/0044061 A1 | 2/2013 | Ashbrook | |
| 2013/0077236 A1 | 3/2013 | Becze et al. | |
| 2013/0078600 A1* | 3/2013 | Fischer | G09B 19/00 434/236 |
| 2013/0194203 A1 | 8/2013 | Tu et al. | |
| 2013/0241890 A1 | 9/2013 | Sharma | |
| 2013/0246861 A1 | 9/2013 | Colley et al. | |
| 2013/0300672 A1 | 11/2013 | Griffin | |
| 2014/0043259 A1* | 2/2014 | Park | G06F 3/0412 345/173 |
| 2014/0049480 A1* | 2/2014 | Rabii | G06F 3/041 345/173 |
| 2014/0049494 A1 | 2/2014 | Niu et al. | |
| 2014/0062893 A1 | 3/2014 | Kawalkar et al. | |
| 2014/0104225 A1* | 4/2014 | Davidson | G06F 3/042 345/174 |
| 2015/0002451 A1* | 1/2015 | Um | G06F 3/0416 345/174 |
| 2015/0138143 A1* | 5/2015 | Ichikawa | G06F 3/045 345/174 |
| 2015/0160780 A1* | 6/2015 | Park | G06F 3/0488 345/173 |
| 2015/0220156 A1* | 8/2015 | Ivankovic | G06T 7/20 345/173 |
| 2015/0264278 A1* | 9/2015 | Kleekajai | H04N 5/2351 348/227.1 |
| 2015/0286334 A1* | 10/2015 | Simmons | G06F 3/0416 345/174 |
| 2016/0026381 A1* | 1/2016 | Kim | G06F 1/165 715/761 |
| 2016/0070413 A1* | 3/2016 | Geaghan | G06F 3/0416 345/174 |

FOREIGN PATENT DOCUMENTS

| | | |
|---|---|---|
| CN | 101963863 | 2/2011 |
| CN | 102830844 | 12/2012 |
| TW | 201222366 A | 6/2012 |
| TW | 201331797 A | 8/2013 |
| WO | WO-2011075270 A2 | 6/2011 |

OTHER PUBLICATIONS

Shahram Izadi et al., "C-Slate: A Multi-Touch and Object Recognition System for Remote Collaboration using Horizontal Surfaces," 2007, pp. 3-10, IEEE.

* cited by examiner

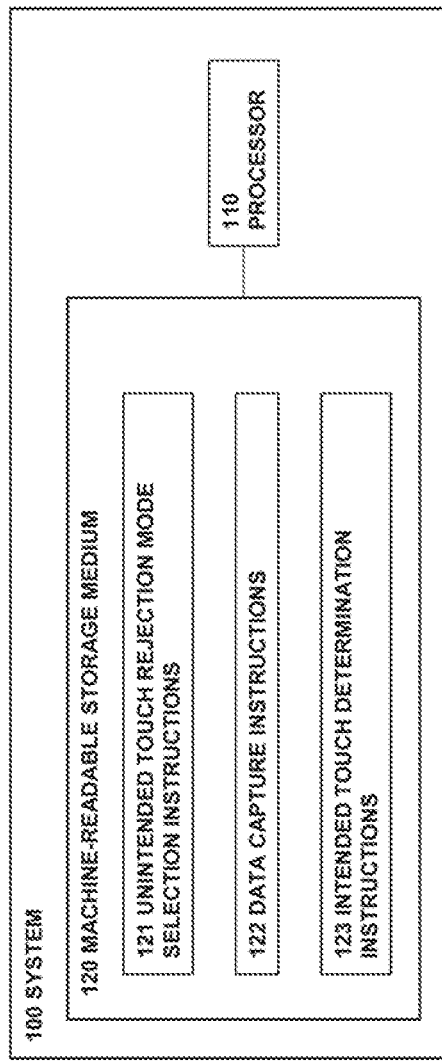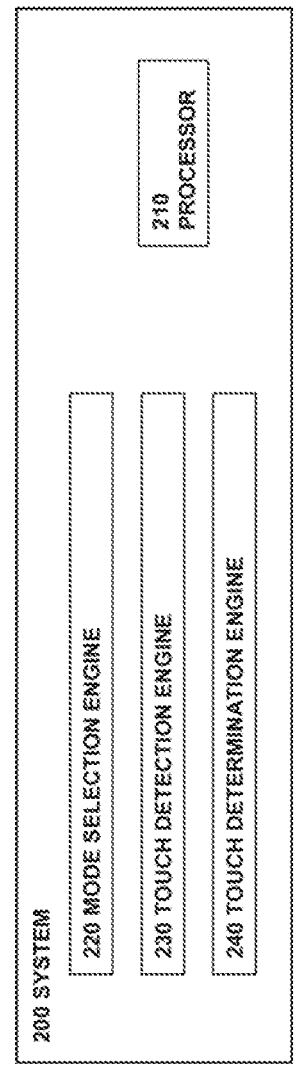

UNINTENDED TOUCH REJECTION

BACKGROUND

Touch enabled surfaces that detect and recognize user touch have become increasingly available and integrated into computing devices. As such, the ability to detect which touches to a touch-enabled surface are intended and which are unintended is beneficial. By detecting that a touch to a touch-enabled surface is unintended and preventing a computing device from responding to the unintended touch, user experience may be improved.

BRIEF DESCRIPTION OF THE DRAWINGS

The following detailed description references the drawings, wherein:

FIG. 1 is a block diagram of an example system for unintended touch rejection;

FIG. 2 is a block diagram of an example system for unintended touch rejection;

DETAILED DESCRIPTION

Figure 3:
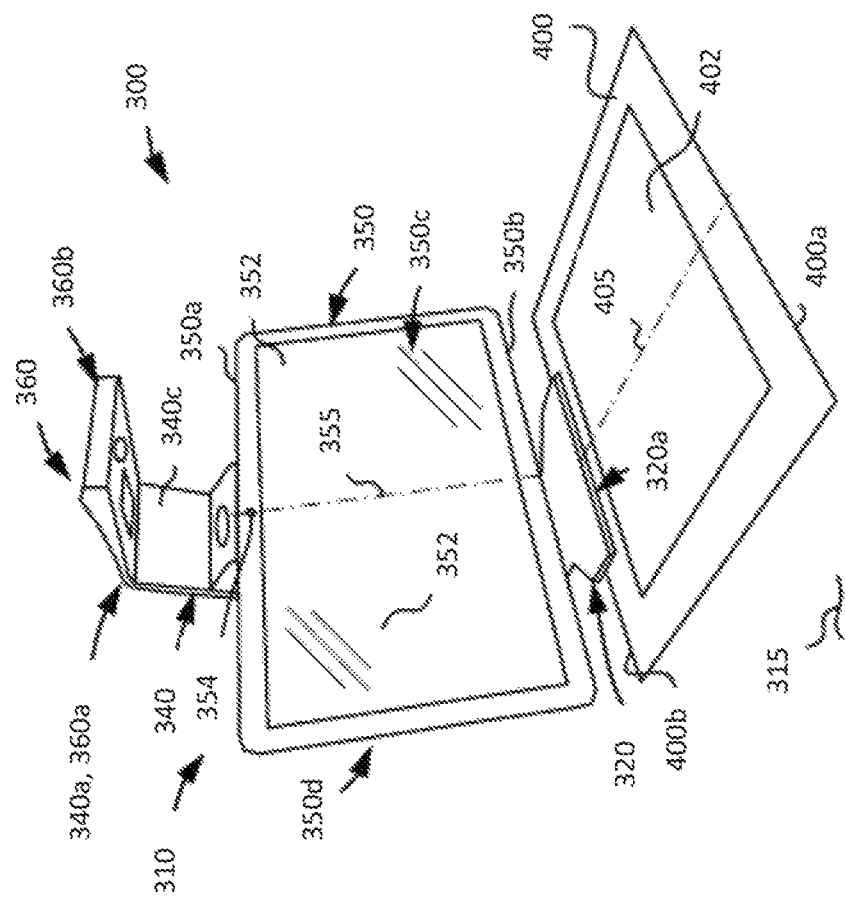
FIG. 3 is a block diagram of an example system for unintended touch rejection.
Figure 4:
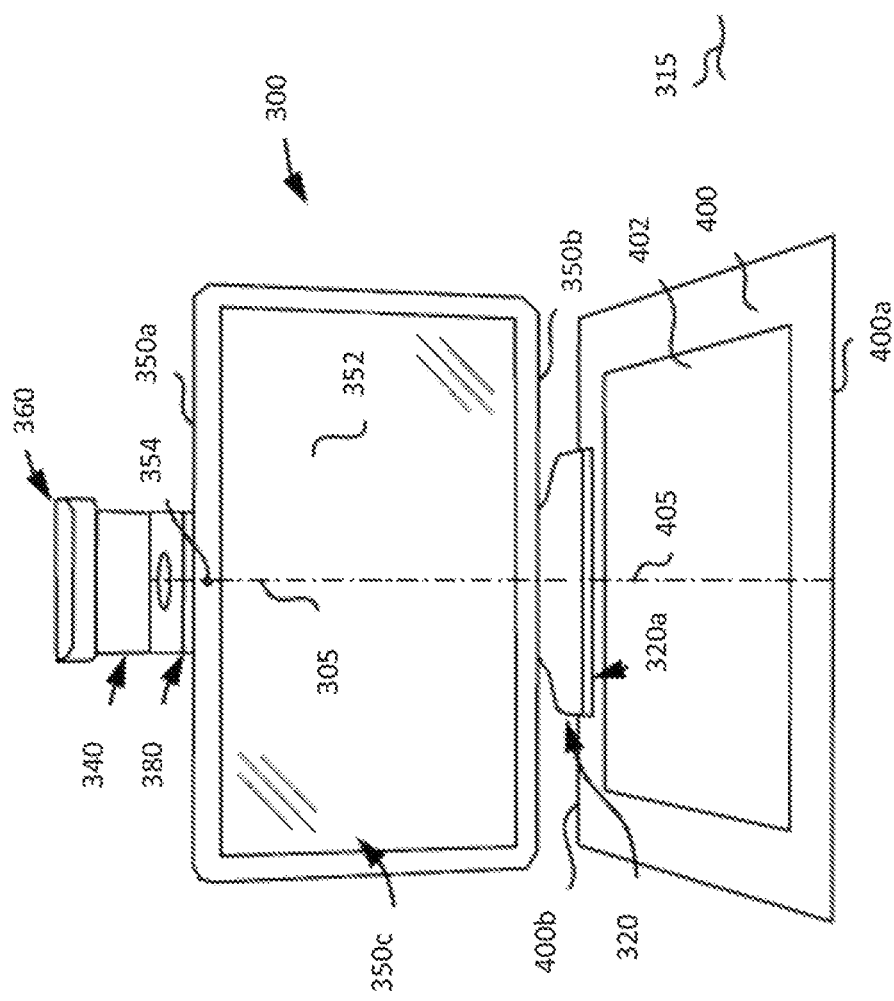
FIG. 4 is a block diagram of an example system for unintended touch rejection.
Figure 5:
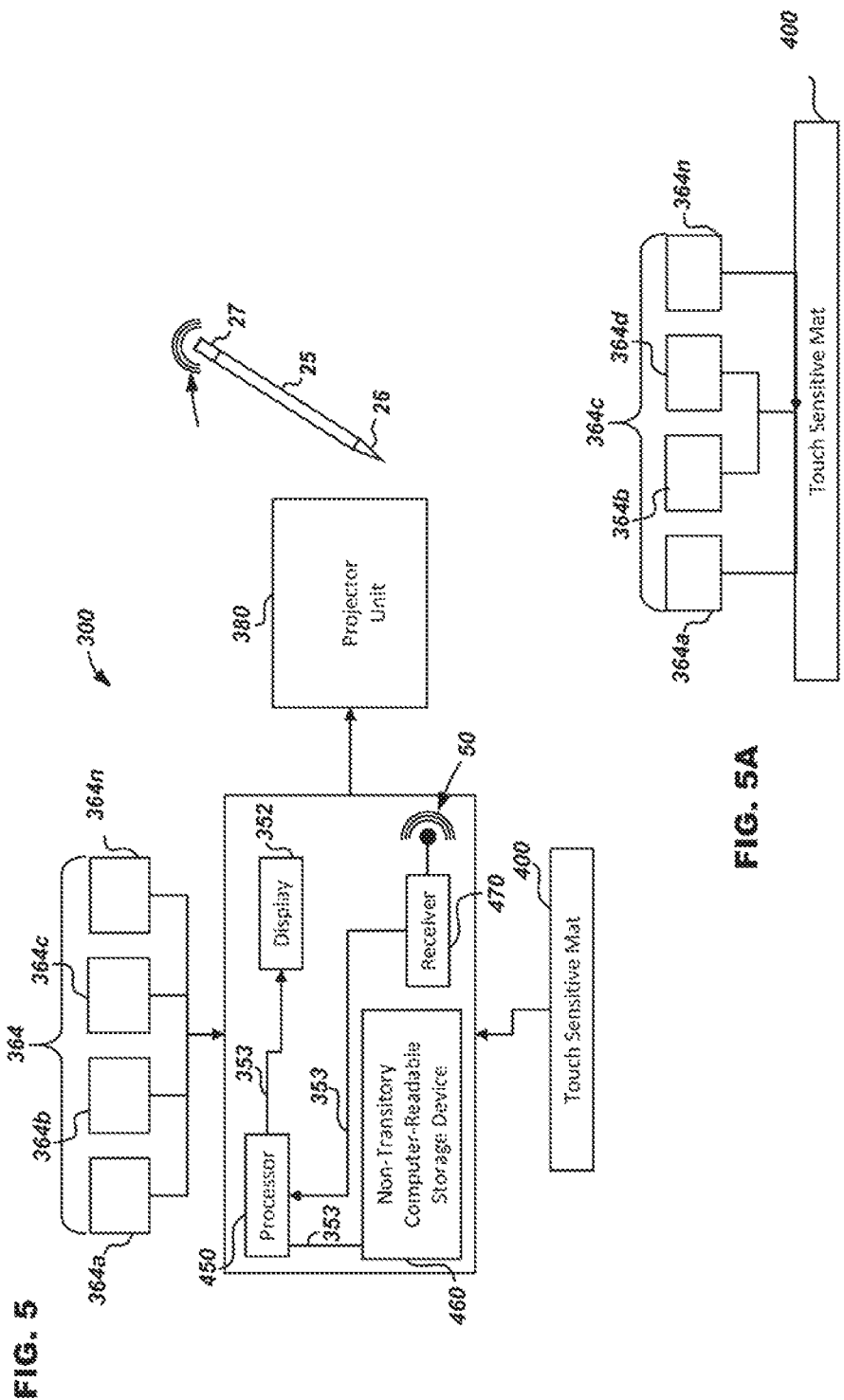
FIG. 5A is a schematic view of an example system for unintended touch rejection.
FIG. 5B is a schematic view of an example touch-sensitive surface in an example system for unintended touch rejection.

The following detailed description refers to the accompanying drawings. Wherever possible, the same reference numbers are used in the drawings and the following description to refer to the same or similar parts. While several examples are described in this document, modifications, adaptations, and other implementations are possible. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct electrical or mechanical connection, through an indirect electrical or mechanical connection via other devices and connections, through an optical electrical connection, through a wireless electrical connection, and/or through any other suitable connection. In addition, as used herein, the phrase "user input device" refers to any suitable device for providing an input, by a user, into an electrical system such as, for example, a mouse, keyboard, a hand (or any finger thereof), a stylus, a pointing device, etc. Accordingly, the following detailed description does not limit the disclosed examples. Instead, the proper scope of the disclosed examples may be defined by the appended claims.

A system with touch-sensitive surfaces may facilitate detection of a touch and response, by the system, to the detected touch. By detecting that a touch to a touch-enabled surface is unintended and preventing a computing device from responding to the unintended touch, user experience may be improved.

The system described herein may facilitate several modes of unintended touch rejection. Each mode of unintended touch rejection may comprise capturing a different set of data, evaluating the captured data to determine whether a detected touch is intended, providing information related to the touch to the system responsive to the detected touch being determined to be intended, and/or otherwise improving responses to detected touches. By having multiple modes of unintended touch rejection and allowing applications and/or users of the system to select a mode of unintended touch rejection in which to operate, the system may provide an improved response to a detected touch and increase the accuracy with which the system handles an unintended touch. The system may also switch between modes of unintended touch rejection based on a desired effect on processing power, a latency of response, and/or other behaviors.

As such, a system for improving unintended touch rejection may select, from a plurality of available modes of unintended touch rejection, a first mode of unintended touch rejection. The system may also capture a first set of data associated with the first mode responsive to a touch being recognized at a touch-enabled surface of the system, and determine whether the recognized touch was intended based on the first set of data and a first set of criteria associated with the first mode of unintended touch rejection.

Referring now to the drawings, FIG. 1 is a block diagram of an example system 100 for improving unintended touch rejection on touch-sensitive components of the system 100. System 100 may be a notebook, desktop, tablet, workstation, mobile device, retail point of sale device, smartphone, all-in-one (AO) computer, gaming device, or any other device suitable for executing the functionality described below. Further, system 100 may comprise at least one touch-sensitive component (e.g., a touch mat, a touch display, and/or other touch-sensitive component). In the example depicted in FIG. 1, system 100 includes a non-transitory machine-readable storage medium 120 and a processor 110.

Processor 110 may be one or more central processing units (CPUs), microprocessors, and/or other hardware devices suitable for retrieval and execution of instructions stored in machine-readable storage medium 120. Processor 110 may fetch, decode, and execute program instructions 121, 122, 123, and/or other instructions to improve unintended touch rejection on touch-sensitive components, as described below. As an alternative or in addition to retrieving and executing instructions, processor 110 may include one or more electronic circuits comprising a number of electronic components for performing the functionality of one or more of instructions 121, 122, 123, and/or other instructions.

In one example, the program instructions 121, 122, 123, and/or other instructions can be part of an installation package that can be executed by processor 110 to implement the functionality described herein. In this case, memory 120 may be a portable medium such as a CD, DVD, or flash drive or a memory maintained by a computing device from which the installation package can be downloaded and installed. In another example, the program instructions may be part of an application or applications already installed on system 100.

Machine-readable storage medium 120 may be any hardware storage device for maintaining data accessible to system 100. For example, machine-readable storage medium 120 may include one or more hard disk drives, solid state drives, tape drives, and/or any other storage devices. The storage devices may be located in system 100 and/or in another device in communication with system 100. For example, machine-readable storage medium 120 may be any electronic, magnetic, optical, or other physical storage device that stores executable instructions. Thus, machine-readable storage medium 120 may be, for example, Random Access Memory (RAM), an Electrically-Erasable Programmable Read-Only Memory (EEPROM), a storage drive, an optical disc, and the like. As described in detail below, machine-readable storage medium 120 may be encoded with executable instructions for improving unintended touch rejection on touch-sensitive components. As detailed below, storage medium 120 may maintain and/or store the data and information described herein.

In some examples, the storage medium 120 may store information related to a set of unintended touch rejection modes based on which the system 100 may improve unintended touch rejection on touch-sensitive components of the system. An unintended touch rejection mode may comprise, for example, a mode of operation by which unintended touch rejection is determined. For example, for an individual unintended touch rejection mode, the storage medium 120 may store information related to parameters by which the mode is started/stopped, a set of data to capture (and/or components to use when capturing the set of data) responsive to a touch being detected while the system is operating in the mode, criteria by which to determine whether a detected touch is intended, and/or other information related to operating the system in the unintended touch rejection mode.

In some examples, the information for each mode of unintended touch rejection may be stored and made available to developers of an application as part of an API stack that may be used. As such, during development of an application and/or other functionality for system 100, a developer may select various modes of unintended touch rejection which may be used during operation of the developed application and/or functionality.

The set of unintended touch rejection modes may comprise a plurality of modes, including a touch-only mode, a region of interest mode, a combined mode, and/or other modes of unintended touch rejection. As mentioned above, and in some examples, for each touch rejection mode, the storage medium 120 may store information related to a set of data to capture while operating the system in that touch rejection mode, a set of devices and/or components of the system to use to capture data, a set of criteria based on which the system may determine whether a detected touch is intended, and/or other information related to determining whether a detected touch was intended while operating in that mode.

For a touch-only mode, the set of data may comprise information related to spatial and temporal features of the detected touch, and/or other information that may be used to determine whether a detected touch was intended based on the touch itself. The set of data may comprise, for example, data captured from one or more sensors and/or from the touch-sensitive component at predetermined time intervals of the detected touch (e.g., every 30 ms, and/or other predetermined time interval). The data captured from the sensors may include, for example, optical data, infrared data, acoustic data, and/or other data that comprises information about the location of the object touching the touch-sensitive component. The data captured from the touch-sensitive surface may comprise, for example, information from sensors, pins, haptic materials, and/or other components in the touch-sensitive component that detect the object's interaction with the touch-sensitive surface.

In some examples, the data from one or both of the sensors and the touch-sensitive component may be used to determine whether the detected touch was intended. For example, the data from the sensors may be used to determine the type of object used to touch the touch-sensitive component of the system, with the data from the touch-sensitive component being used to confirm the determined object type. Further, the data from the sensors and the data from the touch-sensitive component may be used as, the captured set of data to compare whether the touch itself was intended.

For a region of interest mode, the set of data to be captured comprises information related to location of the touch on the touch-sensitive component and a context of an application being executed by the system. The location of the detected touch on the touch-sensitive component may be determined by capturing data from the touch-sensitive component, optical data, acoustic data, infrared data, and/or other data that may be used to determine the location of the detected touch. The context of the application may be obtained from the system, which may be projecting, displaying, and/or otherwise making accessible for viewing images on the touch-sensitive component.

For a combined mode, the set of data to be captured may comprise information that may be captured for a touch-only mode, a region of interest mode, and/or other modes of unintended touch rejection. In some examples, for a combined mode, all information available to be captured by the system relating to a touch event may be captured. For example, the set of data may also include temperature, humidity, depth, acoustic information, and/or other information that may be captured while the touch event is detected.

In some examples, regardless of the mode of unintended touch rejection, the set of data to be captured may include a confidence score associated with the recognized touch. The confidence score may be automatically generated by the touch-sensitive component. In some examples, a third party manufacturer of the touch-sensitive component may generate a confidence score comprising a number value that indicates a confidence that the touch was intended, responsive to a touch being detected. In some examples, this confidence score may be considered during each mode of unintended touch rejection.

In some examples, the set of data may comprise temporally differentiated data. The temporally differentiated data may comprise a first subset of data being captured at a first time interval and a second subset of data different from the first subset being captured at a second time interval after the first time interval. As such, the data in the set of data being captured over time for a detected touch may change.

In some examples, the set of data may be mode-specific and object-specific. For example, a set of data to be captured for touch-only mode where a touch is detected from a human hand may be different for a set of data to be captured for touch-only mode where a touch is detected from a stylus. Similarly, a set of data to be captured for a region of interest mode may differ based on the object being used to touch a touch-sensitive surface of the system.

The set of criteria for each mode may comprise different sets of stored data which may be compared with the captured set of data. An individual stored set of data for a touch-only mode, for example, may comprise shapes of a touch over a set of time intervals. An individual stored set of data for a region of interest mode, for example, may comprise sets of locations on the touch-sensitive component in which a touch may be considered to be intended. An individual stored set of data for a combined mode may include, for example, both sets of locations and shapes of a touch over a set of time intervals, as well as other information related to determining whether a touch is intended.

The set of criteria may also comprise thresholds, standards of deviation, averages, and/or other numerical calculations by which the captured set of data may be compared against the stored sets of data. The comparison may be based on the captured set of data as a whole, based on changes in the captured set of data from one time interval to another across a predetermined set of time intervals, and/or based on other information from the captured set of data. For example, the amount of change to a shape of the detected touch from one time interval to another may be compared to an amount of change to a shape in the stored sets of data. Responsive to the amount of change being more than a threshold amount different from the stored sets of data, being more than a set number of standard deviations from an average amount of change, and/or otherwise meeting criteria by which the touch may be considered unintended, the system may determine that the detected touch was unintended.

In some examples, the set of criteria for a particular mode may also comprise information and/or instructions on how to apply the criteria to the captured set of data. For example, the set of criteria may comprise information related to how to recognize a closest set of stored data to the captured data, which numerical calculations should be used to compare the captured data to the set(s) of stored data, and/or other information related to how to determine whether the touch was intended.

Unintended touch rejection mode selection instructions 121, when executed by processor 110, may select, from a plurality of available modes of unintended touch rejection, a first mode of unintended touch rejection. The first mode may comprise, for example, the touch only mode, the region of interest mode, the combined mode, and/or other mode of unintended touch rejection.

The unintended touch rejection mode selection instructions 121, when executed by processor 110, may receive an indication from the system to select the first mode. The unintended touch rejection mode selection instructions 121, when executed by processor 110, may receive the indication from an application being executed by the system, from user input received by the system, and/or from other sources.

In some examples, the unintended touch rejection mode selection instructions 121, when executed by processor 110, may receive an indication to switch from a first mode of unintended touch rejection to a second mode of unintended touch rejection of the plurality of modes of unintended touch rejection. The unintended touch rejection mode selection instructions 121, when executed by processor 110, may receive the indication to switch modes from an application being executed by the system, from user input received by the system, and/or from other sources.

Responsive to receiving the indication (either to select the first mode or to switch to the second mode), the unintended touch rejection mode selection instructions 121, when executed by processor 110, may cause the system 100 to be operated in the selected mode.

Data capture instructions 122, when executed by processor 110, may capture a first set of data associated with the first mode. The data capture instructions 122, when executed by processor 110, may cause the components and/or devices referenced in the information associated with the first mode and stored in the non-transitory storage medium 120 to capture the data referenced in the associated information.

In some examples, data capture instructions 122, when executed by processor 110, may capture the first set of data associated with the first mode regardless of whether a touch is detected. For example, the data capture instructions 122, when executed by processor 110, may continually capture the first set of data while the system is in the first mode of unintended touch rejection.

In other examples, the data capture instructions 122, when executed by processor 110, may capture the first set of data responsive to a touch being detected at a touch-enabled surface of the system 100, and may continue to capture the first set of data through a predetermined time interval after the touch has been detected as being ended. The data capture instructions 122, when executed by processor 110, may detect that a touch is recognized by the system 100 responsive to a touch being detected at a touch-sensitive component of the system 100. For example, the system 100 may send a signal and/or otherwise indicate to the processor 120 (and/or the data capture instructions 122) that a touch has been detected.

Intended touch determination instructions 123, when executed by processor 110, may determine whether the recognized touch was intended based on the first set of data and a first set of criteria associated with the first mode of unintended touch rejection. In some examples, the intended touch determination instructions 123, when executed by processor 110, may determine whether the recognized touch was intended based on information stored in the storage medium 120 related to the selected first mode. For example, the intended touch determination instructions 123, when executed by processor 110, may obtain information related to how the determination should be made, the stored sets of data with which to compare the captured set of data, the numerical calculations to apply to determine whether the recognized touch was intended, and/or other information related to determining whether the recognized touch was intended. The intended touch determination instructions 123, when executed by processor 110, may determine whether the touch was intended based on the obtained information and the captured set of data.

The intended touch determination instructions 123, when executed by processor 110, may make available to the system information related to the recognized touch responsive to determining that the recognized touch was intended. For example, the intended touch determination instructions 123, when executed by processor 110, may provide the information related to the recognized touch to the processor 120, and/or to other components of the system 100.

In some examples, the intended touch determination instructions 123, when executed by processor 110, may disregard information related to the recognized touch responsive to determining that the recognized touch was not intended. For example, the intended touch determination instructions 123, when executed by processor 110, may not make available the information to the system 100, may delete the captured data from any storage in which it may have been maintained, and/or may otherwise disregard the information related to the recognized touch.

FIG. 2 is a block diagram of an example system 200 for improving unintended touch rejection on touch-sensitive components of the system 200. As with system 100, system 200 may be a notebook, desktop, tablet, workstation, mobile device, retail point of sale device, smartphone, all-in-one (AiO) computer, gaming device, or any other device suitable for executing the functionality described below. As with system 100, system 200 may comprise at least one touch-sensitive component (e.g., a touch mat, a touch display, and/or other touch-sensitive component). As with processor 110 of FIG. 1, processor 220 may be one or more CPUs, microprocessors, and/or other hardware devices suitable for retrieval and execution of instructions. System 200 may also comprise a non-transitory machine-readable storage medium that includes information related to the set of modes as described above with non-transitory machine-readable storage medium 120.

As detailed below, system 200 may include a series of engines 220-240 for improving unintended touch rejection on touch-sensitive components. Each of the engines may generally represent any combination of hardware and programming. For example, the programming for the engines may be processor executable instructions stored on a non-transitory machine-readable storage medium and the hardware for the engines may include at least one processor of the system 200 to execute those instructions. In addition or as an alternative, each engine may include one or more hardware devices including electronic circuitry for implementing the functionality described below.

Mode selection engine 220 may receive an indication of a first mode of unintended touch rejection from a set of available modes of unintended touch rejection. As mentioned above, the set of available modes of unintended touch rejection comprise a first mode (e.g., a touch only mode), a second mode (e.g., a region of interest mode), a third mode (e.g., a combined mode), and/or other modes. In some examples, the mode selection engine 220 may perform this functionality in a manner the same as or similar to that of the unintended touch rejection mode selection instructions 121, and/or other instructions of computing device 100. Further details regarding an example implementation of mode selection engine 220 are provided above in connection with unintended touch rejection mode selection instructions 121, and/or other instructions of FIG. 1.

Touch detection engine 230 may capture a first set of data associated with the first mode responsive to a touch being recognized at a touch-sensitive surface of the system. In some examples, the touch detection engine 230 may perform this functionality in a manner the same as or similar to that of the data capture instructions 122, and/or other instructions of computing device 100. Further details regarding an example implementation of touch detection engine 230 are provided above in connection with data capture instructions 122, and/or other instructions of FIG. 1.

Touch determination engine 240 may determine whether the recognized touch was intended based on the first set of data and a first set of criteria associated with the first mode. In some examples, touch determination engine 240 may determine whether the recognized touch was intended further based on a confidence score associated with the recognized touch. Touch determination engine 240 may also make available to the system information related to the recognized touch responsive to determining that the recognized touch was intended. In some examples, touch determination engine 240 may disregard information related to the recognized touch responsive to determining that the recognized touch was not intended. In some examples, the touch determination engine 240 may perform this functionality in a manner the same as or similar to that of the intended touch determination instructions 123, and/or other instructions of computing device 100. Further details regarding an example implementation of touch determination engine 240 are provided above in connection with intended touch determination instructions 123, and/or other instructions of FIG. 1.

FIG. 3 is a block diagram of an example system 300 for improving unintended touch rejection on touch-sensitive components of the system 300. System 300 may be a notebook, desktop, tablet, workstation, mobile device, retail point of sale device, smartphone, all-in-one (AiO) computer, gaming device, or any other device suitable for executing the functionality described below. As with system 100, system 300 may comprise at least one touch-sensitive component (e.g., a touch mat, a touch display, and/or other touch-sensitive component). As with processor 110 of FIG. 1, processor 450 may be one or more CPUs, microprocessors, and/or other hardware devices suitable for retrieval and execution of instructions. As with storage medium 120, non-transitory storage medium 460 may be any hardware storage device for maintaining data accessible to system 300. Non-transitory machine-readable storage medium 460 may also include information related to the set of modes as described above with non-transitory machine-readable storage medium 120.

Referring now to FIGS. 3-5B, system 300 generally comprises a support structure 310, a computing device 350, a projector unit 380, and a touch sensitive mat 400. Computing device 350 may comprise any suitable computing device. For example, in some implementations, device 350 may comprise an electronic display, a smartphone, a tablet, an all-in-one computer (i.e., a display that also houses the computer's board), or some combination thereof. In this example, device 350 may be an all-in-one computer that includes a central axis or center line 355, first or top side 350a, a second or bottom side 350b axially opposite the top side 350a, a front side 350c extending axially between the sides 350a, 350b, a rear side also extending axially between the sides 350a, 350b and generally radially opposite the front side 350c.

A display 352 defines a viewing surface and may be disposed along the front side 350c to project images for viewing and interaction by a user (not shown). In some examples, display 352 includes touch sensitive technology such as, for example, resistive, capacitive, acoustic wave, infrared (IR), strain gauge, optical, acoustic pulse recognition, or some combination thereof. As such, display 352 may comprise a touch sensitive surface and/or touch-sensitive display.

In addition, in some examples, device 350 further includes a camera 354 that may take images of a user while he or she is positioned in front of display 352. In some examples, camera 354 may be a web camera. Further, in some examples, device 350 also includes a microphone or similar device that is arranged to receive sound inputs (e.g., voice) from a user during operation.

Support structure 310 includes a base 320, an upright member 340, and a top 360. Base 320 includes a first or front end 320a, and a second or rear end. During operation, base 320 engages with a support surface 315 to support the weight of at least a portion of the components (e.g., member 340, unit 380, device 350, top 360, etc.) of system 300 during operation. In this example, front end 320a of base 320 includes a raised portion that may be slightly separated above the support surface 315 thereby creating a space or clearance between the raised portion and surface 315. In some examples, one side of mat 400 may be received within the space, formed between the raised portion and surface 315 to ensure proper alignment of mat 400. The alignment of the mat 400 and the computing device 350 is not limited to the examples described herein.

Upright member 340 includes a first or upper end 340a, a second or lower end opposite the upper end 340a, a first or front side 340c extending between the first end 340a and the second end, and a second or rear side opposite the front side 340c and also extending between the first end 340a and the second end. The second end of member 340 may be coupled to the rear end of base 320, such that member 340 extends substantially upward from the support surface 315.

Top 360 includes a first or proximate end 360a, a second or distal end 360b opposite the proximate end 360a, a top surface extending between the ends 360a, 360b, and a bottom surface opposite the top surface and also extending between the ends 360a, 360b. Proximate end 360a of top 360 may be coupled to upper end 340a of upright member 340 such that distal end 360b extends outward therefrom. In some examples, top 360 may be supported only at end 360a and may be referred to herein as a "cantilevered" top. In some examples, base 320, member 340, and top 360 are all monolithically formed; n some examples, base 320, member 340, and/or top 360 may not be monolithically formed.

Touch mat 400 includes a central axis or centerline 205, a first or front side 400a, and a second or rear side 400b axially opposite the front side 400a. In this example, a touch sensitive surface 402 may be disposed on mat 400 and may be substantially aligned with the axis 405. Surface 402 may comprise any suitable touch sensitive technology for detecting and tracking one or multiple touch inputs by a user in order to allow the user to interact with software being executed by device 350 or some other computing device (not shown). For example, in some implementations, surface 402 may use, for example, resistive, capacitive, acoustic wave, infrared, strain gauge, optical, acoustic pulse recognition, and/or other touch-sensitive technologies. Surface 402 may extend over only a portion of mat 400, may extend substantially over all of mat 400, and/or may extend over another portion of mat 400.

During operation, mat 400 may be aligned with base 320 of structure 310, as previously described to ensure proper alignment thereof. In particular, in this example, rear side 400b of mat 400 may be placed between the raised portion of base 320 and support surface 315 such that rear end 400b may be aligned with front side 320a of base, thereby ensuring proper overall alignment of mat 400, and particularly surface 402, with other components within system 300. In some examples, mat 400 may be aligned with device 350 such that the center line 355 of device 350 may be substantially aligned with center line 405 of mat 400; however, other alignments are possible.

In some examples, surface 402 of mat 400 and device 350 may be electrically coupled to one another such that user inputs received by surface 402 are communicated to device 350. Any suitable wireless or wired electrical coupling or connection may be used between surface 402 and device 350 such as, for example, WI-FI, BLUETOOTH®, ultrasonic, electrical cables, electrical leads, electrical spring-loaded pogo pins with magnetic holding force, and/or other suitable coupling or connection. In this example, exposed electrical contacts disposed on rear side 400b of mat 400 engage with corresponding electrical pogo-pin leads within raised portion of base 320 to transfer signals between device 350 and surface 402 during operation. In some examples, the electrical contacts are held together by adjacent magnets located in the clearance between raised portion of base 120 and surface 315 to magnetically attract and hold (e.g., mechanically) a corresponding ferrous and/or magnetic material disposed along rear side 400b of mat 400.

In some examples, projector unit 380 comprises an outer housing, and a projector assembly disposed within housing. Housing further includes a coupling or mounting member to engage with and support device 350 during operations. In general member may be any suitable member or device for suspending and supporting a computer device (e.g., device 350). For example, the mounting member may comprise a hinge that includes an axis of rotation such that a user (not shown) may rotate device 350 about the axis of rotation to attain an optimal viewing angle therewith. In some examples, device 350 may be permanently or semi-permanently attached to housing of projector unit 380. For example, the housing 380 and device 350 may be integrally and/or monolithically formed as a single unit.

Projector assembly of projector unit 380 may comprise any suitable digital light projector assembly for receiving data from a computing device (e.g., device 350) and projecting an image or images (e.g., out of upper end) that correspond with that input data. For example, in some implementations, projector assembly comprises a digital light processing (DLP) projector or a liquid crystal on silicon (LCOS) projector which are advantageously compact and power efficient projection engines capable of multiple display resolutions and sizes, such as, for example, standard XGA (1024×768) resolution 4:3 aspect ratio or standard WXGA (1280×800) resolution 16:10 aspect ratio.

Projector assembly may be further electrically coupled to device 350 in order to receive data therefrom for producing light and images from end during operation. Projector assembly may be electrically coupled to device 350 through any suitable type of electrical coupling and is not limited to the examples described herein. For example, in some examples, projector assembly may be electrically coupled to device 350 through an electric conductor, WI-FI, BLUETOOTH®, an optical connection, an ultrasonic connection, and/or other suitable connection or coupling. In this example, device 350 may be electrically coupled to assembly through electrical leads or conductors (previously described) that are disposed within mounting member such that when device 350 is suspended from structure 310 through mounting member, the electrical leads disposed within member contact corresponding leads or conductors disposed on device 350.

In some examples, top 360 further includes a fold mirror and a sensor bundle 364. Mirror includes a highly reflective surface that may be disposed along bottom surface of top 360 and may be positioned to reflect images and/or light projected from upper end of projector assembly toward mat 400 during operation. Mirror may comprise any suitable type of mirror or reflective surface while still complying with the principles disclosed herein. In this example, fold mirror may comprise a standard front surface vacuum metalized aluminum coated glass mirror that acts to fold light emitted from projector assembly down to mat 400. In other examples, mirror could have a complex aspherical curvature to act as a reflective lens element to provide additional focusing power or optical correction.

Sensor bundle 364 includes a plurality of sensors and/or cameras to measure and/or detect various parameters occurring on or near mat 400 during operation. For example, bundle 364 includes an ambient light sensor 364a, a camera (e.g., a color camera) 364b, a depth sensor or camera 364c, a three dimensional (3D) user interface sensor 364d, a temperature sensor, a humidity sensor, and/or other sensors 364n.

Ambient light sensor 364a may be arranged to measure the intensity of light of the environment surrounding system 300, in order to, in some implementations, adjust the camera's and/or sensor's (e.g., sensors 364a, 364b, 364c, 364d, . . . , 364n) exposure settings, and/or adjust the intensity of the light emitted from other sources throughout system such as, for example, projector assembly, display 352, etc.

Camera 364b may, in some instances, comprise a color camera which may be arranged to take either a still image or a video of an object and/or document disposed on mat 400.

Depth sensor 364c generally indicates when a 3D object is on the work surface. In particular, depth, sensor 364c may sense or detect the presence, shape, contours, motion, and/or the 3D depth of an object (or specific feature(s) of an object) placed on mat 400 during operation. In some examples, sensor 364c may employ any suitable sensor or camera arrangement to sense and detect a 3D object and/or the depth values of each pixel (whether infrared, color, or other) disposed in the sensor's field-of-view (FOV). For example, sensor 364c may comprise a single infrared (IR) camera sensor with a uniform flood of IR light, a dual IR camera sensor with a uniform flood of IR light, structured light depth sensor technology, time-of-flight (TOF) depth sensor technology, or some combination thereof.

User interface sensor 364d includes any suitable device or devices (e.g., sensor or camera) for tracking a user input device such as, for example, a hand, stylus, pointing device, etc. In some examples, sensor 364d includes a pair of cameras which are arranged to stereoscopically track the location of a user input device (e.g., a stylus) as it is moved by a user about the mat 400, and particularly about surface 402 of mat 400. In other examples, sensor 364d may also or alternatively include an infrared camera(s) or sensor(s) that is arranged to detect infrared light that is either emitted or reflected by a user input device.

Bundle 364 may comprise other sensors and/or cameras either in lieu of or in addition to sensors 364a, 364b, 364c, 364d, and/or other sensors 364n. Each of the sensors 364a, 364b, 364c, 364d, and/or other sensors 364n within bundle 364 may be electrically and communicatively coupled to device 350 such that data generated within bundle 364 may be transmitted to device 350 and commands issued by device 350 may be communicated to the sensors 364a, 364b, 364c, 364d, and/or other sensors 364n during operations.

In some examples, one or more sensors 364a, 364b, 364c, 364d, and/or other sensors 364n of bundle 364 may be integrated within computing device 350, mat 400, and/or other components of system 300. In some examples, the sensors (e.g., sensors 364a, 364b, 364c, 364d, . . . , 364n) within bundle 164 include a sensed space that, in at least some examples, overlaps and/or corresponds with the surface 202 of the touch mat. In some examples, a similar sensor bundle may be used to sense the surface of display 352, which may also be a touch-sensitive surface.

Any suitable electrical and/or communicative coupling may be used to couple sensor bundle 364 to device 350 such as for example, an electric conductor, WI-FI, BLU-ETOOTH®, an optical connection, an ultrasonic connection, or some combination thereof. In this example, electrical conductors are routed from bundle 364, through top 360, upright member 340, and projector unit 80 and into device 350 through the leads that are disposed within mounting member.

In some examples, device 350 directs projector unit 380 to project an image onto surface 402 of mat 400. In addition, device 350 may also display an image on the display 352 (which may or may not be the same as the image projected onto surface 402 by projector unit 380). The image projected by projector unit 380 may comprise information and/or images produced by software executing within device 350. A user (not shown) may then interact with the image displayed on surface 402 and display 352 by physically engaging the touch sensitive surface 402 of mat 400 and/or display 352. Such interaction may take place through any suitable method such as, direct interaction with a user's hand, through a stylus 25, or other suitable user input device(s).

In some examples, responsive to a user interacting with surface 402 of mat 400 (and/or display 352), a signal may be generated which is routed to device 350 through any of the electrical coupling methods and devices previously described. Once device 350 receives the signal generated within mat 400, it is routed, through internal conductor paths 353, to a processor 450 which communicates with a non-transitory computer-readable storage medium 460 to generate an output signal which is then routed back to projector unit 380 and/or display 352 to implement a change in the image projected onto surface 402 and/or the image displayed on display 352, respectively. A user may also be interacting with the image displayed on display 352 through engagement with the touch sensitive surface disposed thereon and/or through another user input device such as, for example, a keyboard and mouse.

In some examples, stylus 25 further includes a transmitter 27 that may be arranged to track the position of stylus 25 (whether or not stylus 25 is interacting with surface 402) and to communicate with a receiver 470 disposed within device 350 through a wireless signal 50. In these examples, input received by receiver 470 from transmitter 27 on stylus 25 is also routed through paths 353 to processor 450 such that an output signal may be generated and routed to the projector unit 380 and/or the display 352 as previously described.

In some examples, sensors disposed within bundle 364 (e.g., sensors 364a, 364b, 364c, 364d, . . . , 364n) may also generate system input which may be routed to device 350 for further processing by processor 450 and storage medium 460. For example, in some implementations, sensors within bundle 364 may sense the location and/or presence of a user's hand or stylus 25 and then generate an input signal which may be routed to processor 450. Responsive to system 300 determining whether the input signal (and touch detected by the interaction between the user's hand/stylus and the touch-sensitive component) is intended, processor 450 may then generate a corresponding output signal which may be routed to display 352 and/or projector unit 380 in the manner described above. Responsive to system 300 determining that the input signal (and touch detected by the interaction between the user's hand/stylus and the touch-sensitive component) is not intended, the signal may be disregarded and may not be routed to processor 460.

In some examples, bundle 364 includes a pair of cameras or sensors that are arranged to perform stereoscopic stylus tracking (e.g., of stylus 25). In still other implementations, stylus 25 includes a tip 26 that may be coated in an infrared retro-reflective coating (e.g., paint), thus allowing it to serve as an infrared retro-reflector. Bundle 364 (and more particularly sensors 364c or 364d) may then further include infrared cameras or sensors as previously described which detect infrared light that is reflected off of tip 26 of stylus 25 and thus track the location of tip 26 as is moves across surface 402 during operation.

As a result, in some examples, the image projected onto surface 202 by assembly 184 serves as a second or alternative touch sensitive display within system 100. In addition, interaction with the image displayed on surface 202 may be further enhanced through use of the sensors (e.g., sensors 364a, 364b, 364c, 364d, . . . , 364n) disposed within bundle 364 as described above.

In some examples, system 300 may comprise the instructions 121, 122, 123, and/or other instructions stored in non-transitory storage medium 460 and may execute functionality similar to the functionality described above with respect to system 100 for improving unintended touch rejection determination for the touch-sensitive components (e.g., touch mat 400, display 352, and/or other-touch sensitive components) using the components and devices of system 300 as described herein.

In some examples, system 300 may comprise the engines 220, 230, 240, and/or other engines of system 200 and may execute functionality similar to the functionality described above with respect to system 200 for improving unintended touch rejection determination for the touch-sensitive components (e.g., touch mat 400, display 352, and/or other-touch sensitive components) using the components and devices of system 300 as described herein.

Figure 6:
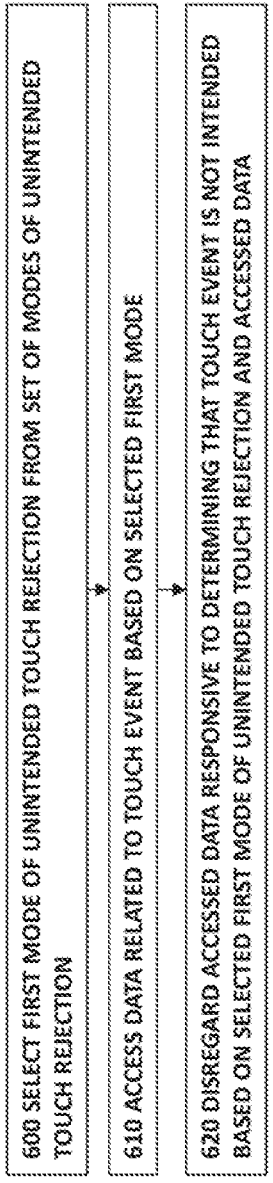
FIG. 6 is a flowchart of an example method for execution system for unintended touch rejection.

FIG. 6 is a flowchart of an example method for execution by a system for improving unintended touch rejection of a touch-sensitive component.

Although execution of the method described below is with reference to system 100 of FIG. 1, other suitable devices for execution of this method will be apparent to those of skill in the art (e.g., system 200 of FIG. 2, and/or system 300 of FIGS. 3-5B, and/or other devices). The method described in FIG. 6 and other figures may be implemented in the form of executable instructions stored on a machine-readable storage medium, such as storage medium 120, by one or more engines described herein, and/or in the form of electronic circuitry.

In an operation 600, a first mode of unintended touch rejection may be selected from a set of modes of unintended touch rejection. For example, the system 100 (and/or the unintended touch rejection mode selection instructions 121, mode selection engine 220, and/or other resource of the system 100) may select the first mode of unintended touch rejection. The system 100 may select the first mode of unintended touch rejection in a manner similar or the same as that described above in relation to the execution of the unintended touch rejection mode selection instructions 121, mode selection engine 220, and/or other resource of the system 100.

In an operation 610, data related to a touch event may be accessed based on the selected first mode. For example, the system 100 (and/or the data capture instructions 122, touch detection engine 230, or other resource of the system 100) may access data. The system 100 may access data in a manner similar or the same as that described above in relation to the execution of the data capture instructions 122, touch detection engine 230, and/or other resource of the system 100.

Figure 6A:
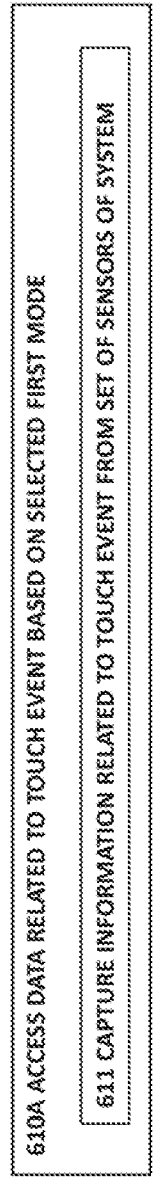
FIG. 6A is a flowchart of an example method for execution for accessing data related to a touch event.
Figure 6B:
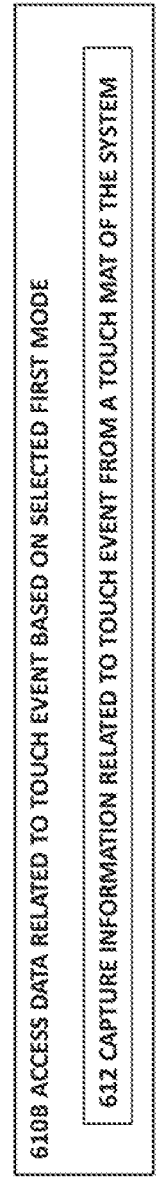
FIG. 6B is a flowchart of an example method execution for accessing data related to a touch event.

In some examples, operation 610 may be performed in various, manners. FIGS. 6A and 6B are flowcharts of an example method for execution by a system for accessing data related to a touch event.

In some examples, and as illustrated in FIG. 6A, in an operation 611, information related to the touch event may be captured from a set of sensors of the system. For example, the system 100 (and/or the data capture instructions 122, touch detection engine 230, or other resource of the system 100) may access data. The system 100 may access data in a manner similar or the same as that described above in relation to the execution of the data capture instructions 122, touch detection engine 230, and/or other resource of the system 100.

In some examples, and as illustrated in FIG. 6B, in an operation 612, information related to the touch event may be captured from a touch mat of the system. For example, the system 100 (and/or the data capture instructions 122, touch detection engine 230, or other resource of the system 100) may access data. The system 100 may access data in a manner similar or the same as that described above in relation to the execution of the data capture instructions 122, touch detection engine 230, and/or other resource of the system 100.

Returning to FIG. 6, in an operation 620, the accessed data may be disregarded responsive to determining that the touch event is not intended based on the selected first mode of unintended touch rejection and the accessed data. For example, the system 100 (and/or the intended touch determination instructions 122, touch determination engine 240, or other resource of the system 100) may disregard the accessed data. The system 100 may disregard the accessed data in a manner similar or the same as that described above in relation to the execution of the intended touch determination instructions 122, touch determination engine 240, and/or other resource of the system 100.

The foregoing disclosure describes a number of examples for changing screen brightness of a computing device. The disclosed examples may include systems, devices, computer-readable storage media, and methods for changing screen brightness of a computing device. For purposes of explanation, certain examples are described with reference to the components illustrated in FIGS. 1-6B, The functionality of the illustrated components may overlap, however, and may be present in a fewer or greater number of elements and components. Further, all or part of the functionality of illustrated elements may coexist or be distributed among several geographically dispersed locations. Moreover, the disclosed examples may be implemented in various environments and are not limited to the illustrated examples.

For example, device 350 has been described as an all-in-one computer, it should be appreciated that in other examples, device 350 may further employ the use of more traditional user input devices such as, for example, a keyboard and a mouse. In another example, while sensors 364a, 364b, 364c, 364d, . . . , 364n within bundle 364 have been described as each representing a single sensor or camera, it should be appreciated that each of the sensors 364a, 364b, 364c, 364d, . . . , 364n may each include multiple sensors or cameras while still complying with the principles described herein. In another example, while top 360 has been described herein as a cantilevered top, it should be appreciated that in other examples, top 360 may be supported at more than one point and thus may not be cantilevered.

Further, the sequence of operations described in connection with FIGS. 1-6B are examples and are not intended to be limiting. Additional or fewer operations or combinations of operations may be used or may vary without departing from the scope of the disclosed examples. Furthermore, implementations consistent with the disclosed examples need not perform the sequence of operations in any particular order. Thus, the present disclosure merely sets forth possible examples of implementations, and many variations and modifications may be made to the described examples. All such modifications and variations are intended to be included within the scope of this disclosure and protected by the following claims.

We claim:

1. A non-transitory machine-readable storage medium comprising instructions for unintended touch rejection, the instructions executable by a physical processor of a system to:

determine, from a selection of an unintended touch rejection mode from a plurality of unintended touch rejection modes received from an application executed by the system, the unintended touch rejection mode to be utilized by the system to perform unintended touch rejection on subsequently detected touch inputs to the application, wherein each unintended touch rejection mode includes:
   a respective parameter to start and stop a corresponding unintended touch rejection mode,
   respective data to be captured responsive to a touch while the system is operated in the corresponding unintended touch rejection mode, and
   respective criteria to determine whether the touch is intended in the corresponding unintended touch rejection mode; and
capture data specified by the determined unintended touch rejection mode and determine whether a subsequently detected touch input at a touch-enabled surface of the system was intended based on the captured data and a criteria specified by the determined unintended touch rejection mode,
wherein the plurality of unintended touch rejection modes includes:
   a touch only mode to detect whether the subsequently detected touch input is intended based on spatial, temporal, and touching-object type features of the subsequently detected touch input;
   a region of interest mode to detect whether the subsequently detected touch input is intended based on a location where the subsequently detected touch input is received in a context of the application; and
   a combined mode to detect whether the subsequently detected touch input is intended based the spatial, temporal, and touch-object type features of the subsequently detected touch input, the location where the subsequently detected touch input is received in the context of the application, and sensor data detected when the subsequently detected touch input is received.

2. The storage medium of claim 1, further comprising instructions executable by the processor of the system to:
capture the sensor data
   from a set of sensors of the system, where the set of sensors comprise one or more of: optical sensors or acoustic sensors.

3. The storage medium of claim 1, further comprising instructions executable by the processor of the system to:
   make available to the system information related to the subsequent touch input responsive to determining that the subsequently detected touch input was intended.

4. The storage medium of claim 1, wherein the instructions executable by the processor of the system to determine the unintended touch rejection mode comprise instructions to:
   determine the unintended touch rejection mode without referencing a previously detected touch input.

5. The storage medium of claim 1, further comprising instructions executable by the processor of the system to:
   receive an indication from the application being executed by the system to switch from the determined unintended touch rejection mode to a different unintended touch rejection mode of the plurality of unintended touch rejection modes without referencing a previously detected touch input.

6. The storage medium of claim 1, wherein the comparison is based on the captured data as a whole, based on changes in the captured data from one time interval to another across a predetermined set of time intervals, and/or based on other information from the captured data.

7. A system for unintended touch rejection, the system comprising:
   a mode selector to:
      select, without referencing a prior touch input, an unintended touch rejection mode of a plurality of unintended touch rejection modes to be utilized by the system to perform unintended touch rejection on subsequently detected touch inputs to an application executed by the system according to a selection of the unintended touch rejection mode received from the application, wherein each unintended touch rejection mode from the plurality includes:
         information related to respective parameters to start and stop a corresponding unintended touch rejection mode,
         respective data to be captured responsive to a touch while the system is operated in the corresponding unintended touch rejection mode, and
         respective criteria to determine whether the touch is intended;
   a touch detector to:
      capture specified by the selected unintended touch rejection mode responsive to a subsequently detected touch input being recognized at a touch-sensitive surface of the system; and
   a touch determinator to:
      determine whether the recognized subsequently detected touch input was intended based on the captured data and criteria associated with selected unintended touch rejection mode,
   wherein the plurality of unintended touch rejection modes includes:
      a touch only mode, wherein the touch only mode detects whether the recognized subsequently detected touch input is intended based on spatial, temporal, and touchinq-object type features of the recognized subsequently detected touch input,
      a region of interest mode, wherein the region of interest mode detects whether the recognized subsequently detected touch input is intended based on a location where the recognized subsequently detected touch input is received in a context of the application, and
      a combined mode, wherein the combined mode detects whether the recognized subsequently detected touch input is intended based the spatial, temporal, and touch-object type features of the recognized subsequently detected touch input, the location where the recognized subsequently detected touch input is received in the context of the application, and sensor data detected when the subsequently detected touch input is received.

8. The system of claim 7, wherein the touch determinator:
   disregards information related to the recognized subsequently detected touch input responsive to determining that the recognized subsequently detected touch input was not intended.

9. The system of claim 7, wherein the the sensor data includes temperature, humidity, depth, and acoustic information detected when the recognized subsequently detected touch input is received.

10. The system of claim 7, wherein the touch determinator determines whether the recognized subsequently detected touch input was intended further based on a confidence score associated with the recognized subsequently detected touch input.

11. A method for execution by a set of physical processors of a system for unintended touch rejection, the method comprising:

selecting, from a set of modes of unintended touch rejection, a first mode of unintended touch rejection to be utilized by the system to perform unintended touch rejection on subsequently detected touch inputs, wherein each individual mode included within the set of modes includes:

information related to a respective parameter to start and stop-a corresponding mode, respective data to be captured responsive to a touch while the system is operating in the corresponding mode, respective criteria to determine whether the touch is intended, and wherein the respective criteria includes thresholds, standards of deviation, and averages by which the captured data may be compared against stored-data, and wherein the selecting is performed without referencing a previously detected touch input; and accessing captured data related to a subsequently detected touch input recognized based on the selected first mode of unintended touch rejection, wherein accessing the captured data includes capturing information related to the subsequently detected touch input from a secondary touch sensitive display of the system according to an information capturing methodology specified by the first mode of unintended touch rejection;

wherein the set of modes of unintended touch rejection modes includes:

a touch only mode, wherein the touch only mode detects whether the recognized subsequently detected touch input is intended based on spatial, temporal, and touching-object type features of the recognized subsequently detected touch input, a region of interest mode, wherein the region of interest mode detects whether the recognized subsequently detected touch input is intended based on a location where the recognized subsequently detected touch input is received in a context of the application, and a combined mode, wherein the combined mode detects whether the recognized subsequently detected touch input is intended based the spatial, temporal, and touch-object type features of the recognized subsequently detected touch input, the location where the recognized subsequently detected touch input is received in the context of the application, and sensor data detected when the subsequently detected touch input is received.

12. The method of claim 11, further comprising:

disregarding the captured data in response to determining that the subsequently detected touch input is not intended based on the selected first mode of unintended touch rejection and the captured data.

13. The method of claim 11, wherein accessing the captured data related to the subsequently detected touch input comprises:

capturing the information related to the subsequently detected touch input from the secondary touch sensitive display of the system according to the information capturing methodology of the first mode of unintended touch rejection specifying capturing the information related to the subsequently detected touch input from a set of sensors of the system monitoring the secondary touch sensitive display, where the set of sensors comprise one or more of: optical sensors or acoustic sensors.

14. The method of claim 11, wherein accessing the data related to the subsequently detected touch input comprises:

capturing the information related to the subsequently detected touch input from the secondary touch sensitive display of the system according to the information capturing methodology of the first mode of unintended touch rejection specifying capturing the information related to the subsequently detected touch input from a touch mat of the system.

\* \* \* \* \*